May 5, 1959 M. R. EMERSON ET AL 2,885,602

MODULAR CIRCUIT FABRICATION

Filed April 4, 1955 2 Sheets-Sheet 1

INVENTORS:
Marvin R. Emerson
Martin L. Hoover
By Louis A Kline
John T. Matlago, Agent
Their Attorneys.

INVENTORS:
Marvin R. Emerson
Martin L. Hoover

Earl Beust
By Louis A. Kline
John J. Matlago, Agent
Their Attorneys.

2,885,602

MODULAR CIRCUIT FABRICATION

Marvin R. Emerson, Los Angeles, and Martin L. Hoover, Downey, Calif., assignors to The National Cash Register Company, Dayton, Ohio, a corporation of Maryland Application April 4, 1955, Serial No. 498,962

14 Claims. (Cl. 317—101)

This invention relates to the fabrication of electronic type circuits and more particularly to an arrangement comprising connector boards and pluggable components therefor which can be utilized to construct any desired circuit within the physical limitations thereof.

The problem of wiring an experimental circuit configuration is both laborious and time consuming. Unless exceptional care and skill are employed, much trouble can be derived from imperfect assembly caused, for example, by "cold" solder junctions and incorrect wiring connections resulting from the difficulty of translating the schematic diagram to a mental picture of the physical layout of the circuit. Also, due to the experimental nature of most breadboard construction and the frequent changes in parameters necessitated thereby, components such as resistors, capacitors, transistors, reactors, etc. are generally excessively handled and subjected to temperatures during soldering operations other than those recommended by their manufacturers. Furthermore, it is often desirable to make changes in circuit configurations rapidly and in values smaller than available for components manufactured in standard sizes and tolerances, as, for example, when making an experimental determination of optimum parameters for a circuit. At times, due to the physical limitations of chassis, such changes involve extra handling, such as the drilling of holes to combine a plurality of metal chassis, which is time-consuming and destructive of components already mounted.

It is, accordingly, an object of this invention to provide means adaptable to breadboard circuitry construction which eliminates soldering, and requires only minimum handling of circuit components.

It is another object of this invention to provide versatility in experimental circuit construction in which removable and interchangeable components are utilized as opposed to the rigid permanent connections ordinarily used in breadboard construction.

It is another object of this invention to provide a method for the rapid assembly and/or disassembly of components of electronic circuits.

A further object of this invention is to provide rapid means for varying the parameters of an electronic circuit.

It is another object of this invention to provide rapid means for the identification of the magnitude of circuit components.

It is another object of this invention to provide a circuit board upon which any desired circuit, within the physical limitations thereof, can be constructed. Prominent features of the invention in this respect are the ease with which circuitry so constructed can be traced and with which connections provided can be recognized, and the increased accessibility of junctions to be used as test points.

It is still another object of this invention to provide means for extending the educational values of circuits made up in the breadboard form and for rendering possible the longer and fuller use thereof.

Briefly, the present invention provides means for constructing from standard electrical or electronic components, and with considerable latitude, a circuit capable of representation by a schematic diagram. These means comprise a base plate fitted with a plurality of spaced terminals which permit connections thereto both above and below the base plate; a large assortment of electronic components (resistors, capacitors, tube sockets, potentiometers, etc.) each mounted on a pedestal provided with terminals; spacer units employed mainly for making connection between a base plate and a pedestal assembly situated on a different vertical level, for example; and jumper connections of various lengths for providing a short circuit connection between terminals.

In assembling circuit components to correspond with a schematic circuit diagram, one or more base plates, depending on the size of the circuit contemplated, are employed as support for an assortment of the other components aforementioned, which are plugged into the base plate terminals, using both sides of the base plate and "bridging" from one base plate to another, if necessary. Since the distance between adjacent terminals of the base plate and of the component pedestals is established as the "building block," i.e., the modular unit of construction for the invention, the circuit may be assembled such that, in appearance, close resemblance to the schematic diagram is attained.

Additional features and objects of this invention will be presented in connection with the ensuing detailed description of the drawings in which.

Figures 1, 4A, 4B:
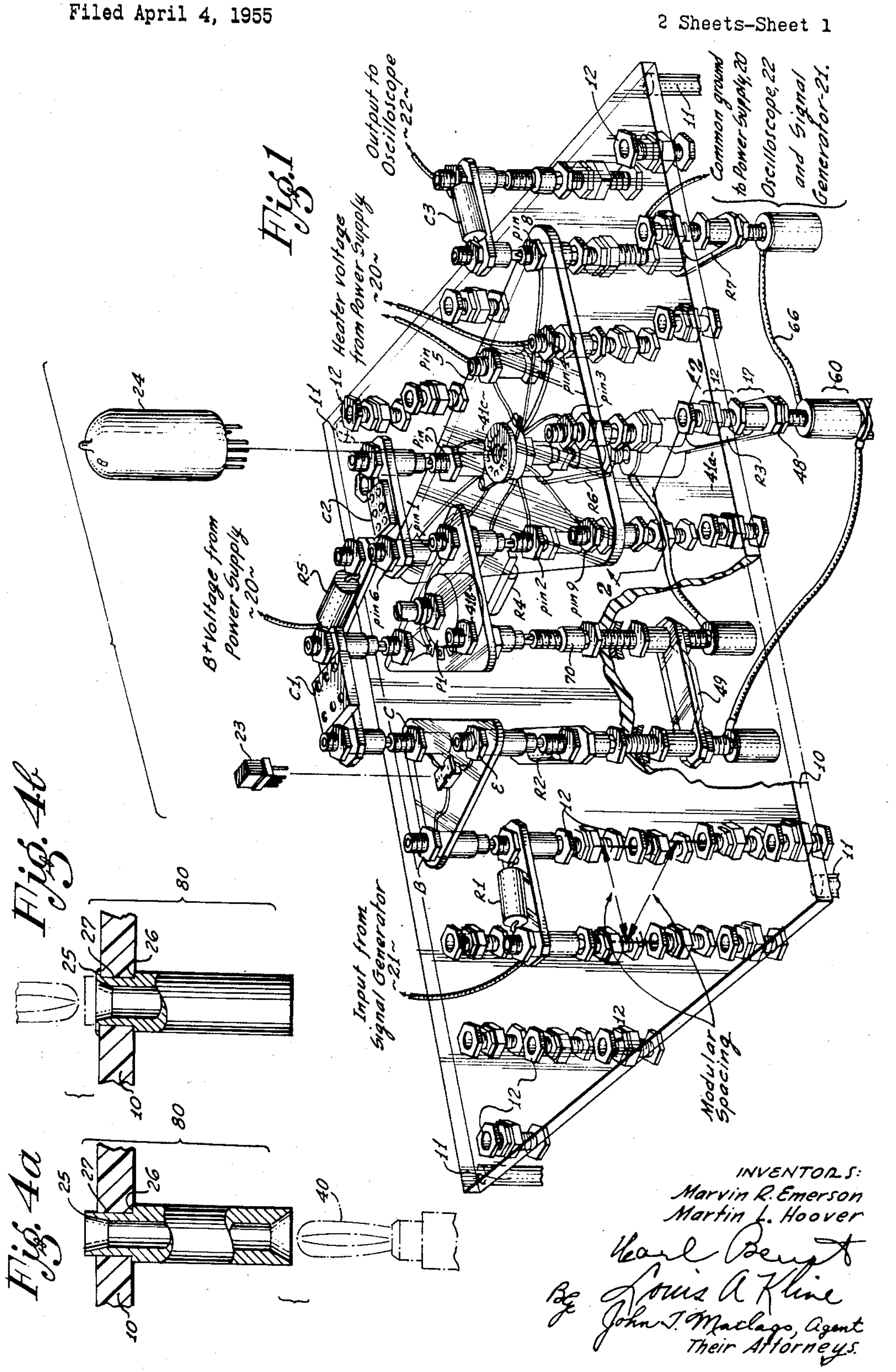
Fig. 1 is an oblique top view of a circuit set up in accordance with the invention as a breadboard model of the schematic diagram of Fig. 3.
Figure 2:
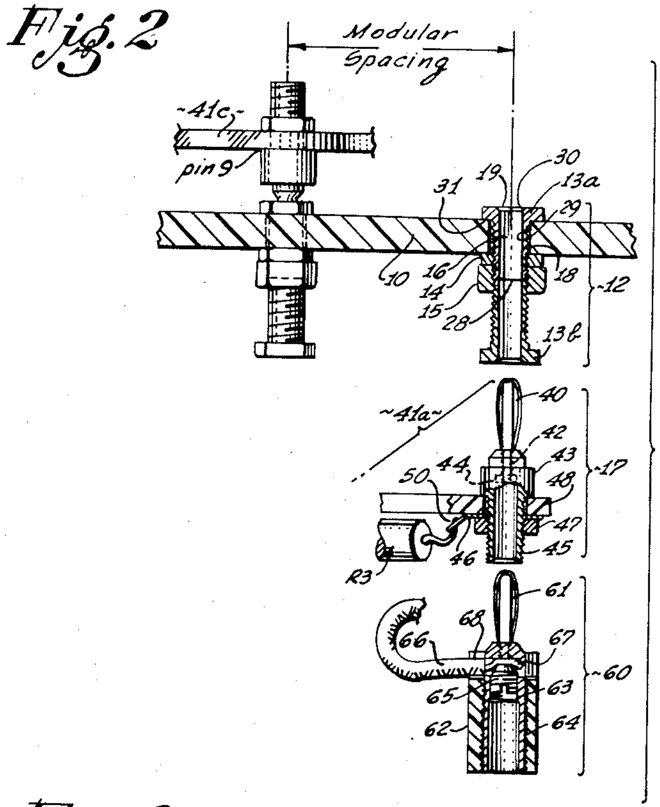
Fig. 2 is a cross-sectional "exploded" view taken along the plane of line 2—2 of Fig. 1, showing the base plate and component pedestal details.

Fig. 4*a* shows an alternate construction for the dual jack shown in Fig. 2.

Fig. 4*b* shows how the dual jack of Fig. 4*a* is retained in the base plate.

Reference will first be made to Fig. 1 which shows an oblique view of a circuit constructed in accordance with the invention. Base plate 10 is equipped with legs 11 to provide sturdy support therefor. Base plate 10 can be fabricated from any appropriate insulating material, although, in the preferred form, the plate is made of a transparent plastic, such as "Lucite," approximately ¼ inch thick. Base plate 10 is fitted with a plurality of identical dual jacks 12 spaced in a plurality of rows such that adjacent dual jacks of a row are equidistant and the dual jacks of a row are offset to be situated midway between those of the neighboring rows. Thus, a dual jack of one row together with the two closest dual jacks of a neighboring row are situated at the points of an equilateral triangle, the length of a side of which comprises the basic modular unit of construction for the invention. It is to be noted that the edges of base plate 10 occur along lines midway between the dual jacks, thereby providing for expansibility; that is, circuits may be built up employing a plurality of base plates 10 in juxtaposition, inasmuch as the modular spacing (i.e., between dual jacks) is preserved.

Referring next to Fig. 2, a cross-sectional "exploded" view taken along the plane of line 2—2 of Fig. 1, the assembly comprising the dual jack 12 is seen to consist of two identical single jacks 13*a* and 13*b* and two nuts 14 and 15. Single jack 13*a* is of the well-known "banana" type having a body 29 with a central hole 16, which is suitable to permit insertion of a "banana" plug, such as plug 40. As shown, hole 16 is counterbored at surface 30 to form an entry for receipt of the plug. Jack 13*a* is provided with a flange 19 at one end whose shoulder 31 abuts against the surface of base plate 10 when the body 29 of the jack is inserted in a clearance hole provided in the plate. Retention of jack 13*a* in base plate 10 is secured by pressure exerted by nut 14 engaging threads on the external surface of body 29. End 28 of single jack 13*a* is firmly held in position against the corresponding end of a similar single jack 13*b* by nut 15, preferably half of the threads of which engages each of the single jacks.

It is to be noted that an equivalent construction can be obtained by the use of threaded rod of suitable dimensions in place of both single jacks 13*a* and 13*b* and nuts positioned thereon both above and below base plate 10. Also, reference to Figs. 4*a* and 4*b* will indicate an alternate, more economical construction for a terminal of the type contemplated which has the advantages of being in one piece and unthreaded. This alternate construction of the dual jack, designated by reference numeral 80, is provided with an end 27 of reduced diameter which is positioned in an appropriate hole in base plate 10 from one side thereof and is suitably long to protrude through to the other side thereof when base plate 10 contacts shoulder 26. As shown in Fig. 4*b*, this construction is adaptable to be retained on base plate 10 by spin swaging at end 25 thereof.

Returning to Fig. 2, terminal 17, employed as electrical contact means for the component pedestals, such as component pedestal 41*a* (Fig. 1), is seen to comprise a plug-and-jack combination, also of the "banana" type. Terminal 17 consists of plug 40, bushing 43, jack 45, solder lug 46, and nut 47. Plug 40 is screwed into threaded hole 42 in one end of bushing 43. The opposite end of bushing 43 is provided with threaded hole 44 into which is screwed jack 45. It is to be noted that jack 45 is similar in construction to jack 13*a* except that no flange is provided on the end thereof. The foregoing assembly is inserted into a suitable hole in pedestal plate 48, solder lug 46 is set in position, and retention is provided by pressure from nut 47. The electronic component, in this case resistor R3, is mounted in place on pedestal plate 48 by soldering a terminal thereof to protruding end 50 of solder lug 46. It is to be noted that pedestal plate 48 is fabricated preferably of the same material as base plate 10. It is also to be noted, as shown in Fig. 1, that a direct shorting connection may be provided between the terminals of a component pedestal by the use of bus bar 49 attached to solder lug 46.

Also shown in Fig. 2 are the details of terminal 60 of flexible jumper 66 employed to make contact between pedestal terminal 17 and a similar terminal for the pedestal on which resistor R7 is mounted, as shown in Fig. 1. Terminal 60 comprises plug 61 (similar to plug 40 already described) screwed into insulated bushing 62 which also contains jack 64 (similar to jack 45). Retained in bushing 62 at the base of jack 64 is sleeve 63 which is threaded to receive set screw 65. As shown, conductor 67 enters terminal 60 via hole 68, through the sides of both insulated bushing 62 and sleeve 63, and held in position by set screw 65.

Also to be noted from Fig. 1 is the use of spacer terminal 70 employed to make connection vertically between base plate 10 and component pedestal 41*b* supporting potentiometer P1. In structure, spacer terminal 70 is identical to terminal 17 except for the omission of solder lug 46 and nut 47, and may be inserted wherever it is desired to arrange for a vertical contact, for instance, between a base plate and a component pedestal or between component pedestals.

It is to be noted that among the advantages of the invention over other boards of this type known in the art is the fact that the connections thereof can be easily and rapidly made from a supply of standardized electronic components, each mounted on separate pedestals. Examples of three- and nine-terminal pedestal assemblies are shown in Fig. 1 as pedestal assemblies 41*b* and 41c, respectively. Such versatility is especially useful in the laboratory to a research or design engineer testing a particular electrical component for optimum circuit parameters.

As will next be shown, the invention enables a circuit to be built from rugged, durable components with the exertion of but very little labor.

For this purpose, the schematic diagram of Fig. 3 will be described and shown as one that may be constructed employing the invention.

Figure 3:
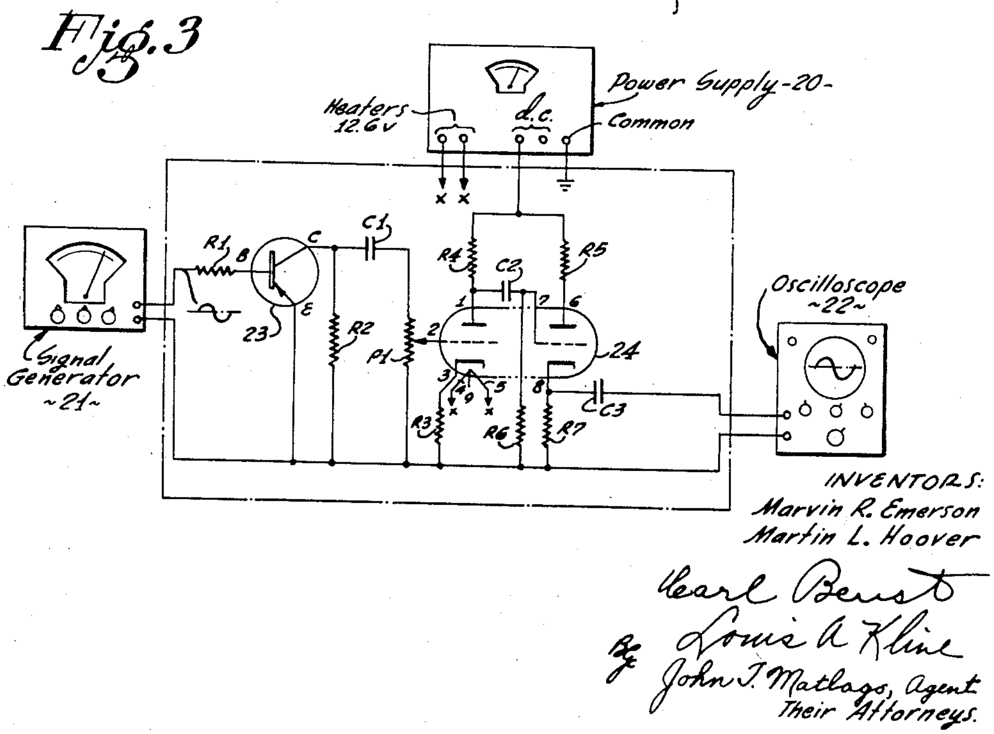
Fig. 3 is a schematic diagram of the circuit used as an example to illustrate the invention.

Briefly, Fig. 3 shows a schematic of an experimental amplifier circuit, for which it is desired to measure performance characteristics as a circuit parameter thereof is changed. It is noted that the circuit comprises an input stage employing transistor 23 as an amplifier followed by dual triode vacuum tube 24 as an amplifier driving a cathode-follower output stage, all well known to the art. Power to the circuit is supplied by power supply 20; input is provided from signal generator 21; and output is observed on the screen of oscilloscope 22. The object of the experiment is to observe changes in the circuit output as a result of increasing the value of coupling capacitor C1 by small amounts, keeping all other circuit parameters constant.

In constructing the circuitry of Fig. 3 by the use of the present invention, each of the resistors R1, R2, R3, R4, R5, R6, and R7, as mounted on two-terminal pedestal assemblies, such as pedestal assembly 41*a*, are selected. Similarly, each of the capacitors C1, C2, and C3, as mounted on two-terminal pedestal assemblies, are selected. In addition, components such as potentiometer P1 and transistor 23, mounted on three-terminal pedestal assemblies, are selected. Finally, a nine-terminal pedestal assembly, on which tube 24 is mounted, is selected.

These pedestal assemblies, together with bus bar 49, spacers, such as 70, and jumpers, such as 66, are used to construct the circuitry shown in Fig. 3, in a manner illustrated in Fig. 1.

It is noted that, as a result of the advantage of modular spacing between terminals, the physical appearance of the layout of components closely resembles that of Fig. 3. Thus the position of capacitor C1 is immediately apparent and accessible. Thus, by merely plugging other capacitor pedestals into the jacks of the pedestal which retains capacitor C1, thereby paralleling capacitor C1, the value of coupling capacitance between collector terminal C of transistor 23 and potentiometer P1 may be increased by any desired amount in accordance with well-known rules governing paralleled capacitors. Additionally, the present values of coupling capacitance as well as salient voltages and other circuit characteristics may be written directly on base plate 10 or the component pedestals with a grease pencil or the like, thereby dispensing with reference to the schematic diagram during experimentation.

It should also be readily apparent that the circuitry of Fig. 3, as constructed in Fig. 1, cannot only be easily and rapidly modified; but the components, after disassembly, can also be used, indefinitely and repeatedly without deterioration or abuse, to construct other circuits.

While the form of the invention shown and described herein is admirably adapted to fulfill the object primarily stated, it is to be understood that it is not intended to confine the invention to the one form or embodiment disclosed herein, for it is susceptible of embodiment in various other forms.

What is claimed is:

1. A circuit fabrication comprising: a base plate provided with an array of electrical terminal locations arranged in rows according to an equilateral triangular mode repetitive in at least two directions on the face of the plate so that any terminal location is located equal distances from all next-adjacent terminal locations and each non-marginal terminal location is equidistant from six other terminal locations; a plurality of electrical terminals mounted at respective ones of the terminal locations of said base plate, said terminals being insulated from each other and from said base plate; a plurality of pedestals; a plurality of electrical terminals attached to each said pedestal and situated thereon such that adjacent terminals are spaced apart a distance corresponding to that separating adjacent terminals of said base plate, said pedestal terminals being insulated from each other and from said pedestal; an electronic circuit component mounted on each of said pedestals, the electrical ends of said component being connected to said pedestal terminals, the terminals of said pedestals being adapted to engage the terminals in said base plate and the terminals of other pedestals; and jumpers provided with connectors for connecting any terminal to any other terminal, whereby a circuit is constructed in accordance with a schematic diagram thereof.

2. A circuit fabrication comprising: an insulator base plate provided with an array of terminal locations arranged in rows according to an equilateral triangular mode repetitive in at least two directions on the face of the plate so that any terminal location is located equal distances from all next-adjacent terminal locations and each non-marginal terminal location is equidistant from six other terminal locations; a plurality of electrical terminals mounted at respective ones of the terminal locations of said base plate; a plurality of insulator pedestals; a plurality of electrical terminals attached to each said pedestal and situated thereon such that adjacent terminals are spaced apart a distance corresponding to that separating adjacent terminals of said base; an electrical component mounted on each of said pedestals, the electrical ends of said component being connected to the terminals of said pedestal; and means to connect the terminals of each said pedestal to the terminals of said base and to the terminals of the other pedestals, from the top or bottom of said base, whereby a circuit is constructed in accordance with a schematic diagram thereof.

3. The combination of claim 2 wherein each of said electrical terminals on said insulator base comprises a dual receptacle formed of electrically conducting tubing having a reduced exterior diameter portion thereof inserted into said base, the end of said reduced portion capable of being swaged to provide retention on said base.

4. A universal plug-in type circuit construction comprising: a transparent insulator base provided with an array of electrical terminal locations arranged in rows according to an equilateral triangular mode repetitive in two directions on the face of the plate so that any terminal location is located equal distances from all next-adjacent terminal location and each non-marginal terminal location is equidistant from six other terminal locations; a plurality of jacks mounted at respective terminal locations on said base; a plurality of insulator pedestals, each having an electrical component positioned thereon, the leads from said component each being connected to a terminal connector; a composite plug-and-jack device affixed to the terminal connectors of said insulator pedestals, the distance between two adjacent plug-and-jack devices on an insulator pedestal being equal to the distance between adjacent base jacks, and said plug-and-jack device having a pressure-urging plug portion for connection to said base jacks; whereby each said plug-and-jack device may be plugged into said base from either the top or bottom thereof or into another said insulator pedestal so as to form a friction locked connection.

5. A circuit fabrication comprising: a base plate provided with an array of apertures therethrough arranged in rows according to an equilateral triangular mode repetitive in at least two directions on the face of the plate so that any aperture is located equal distances from all next-adjacent apertures and each non-marginal aperture is equidistant from six other apertures; a plurality of electrical sockets, each mounted in a respective one of the apertures in said base plate; a plurality of electronic circuit components; a plurality of electrical terminals for the electrical ends of each component, said terminals being attached to the component such that adjacent terminals are spaced apart the fixed distance between adjacent sockets, and said terminals having socket portions similar to said sockets and plug portions capable of mating with said sockets and socket portions of other terminals; and means capable of wiring together terminals and sockets requiring connection in accordance with a circuit diagram where such connection cannot be provided by mating sockets and terminals.

6. A circuit fabrication comprising: an insulator base; a plurality of electrical terminals provided in said base in a plurality of rows such that a terminal of a row together with the two terminals closest to said terminal in an adjacent row are situated at the corners of an equilateral triangle and such that any non-marginal terminal is equidistant from six adjacent terminals, each said terminal on said base plate having an opening; a plurality of insulator pedestals; a plurality of electrical terminals attached to each said pedestal and situated thereon such that adjacent terminals are spaced apart a distance corresponding to that separating adjacent terminals of said base; an electrical component mounted on each of said pedestals, the electrical ends of said component being connected to the terminals of said pedestal, said terminals on said pedestals comprised of connectors disposed at right angles to the plane of said pedestal and having openings on one end thereof such that the terminal connectors of said pedestals can be inserted into the terminal openings of said base, and into the terminal openings of other pedestals, to thereby provide components located in a plurality of planes parallel to the plane of the base; and jumper means capable of connecting any terminal to any other terminal, whereby a circuit is constructed in accordance with a schematic diagram thereof.

7. Experimental electronic circuit construction means adapted for rapid assembly, modification, and disassembly of a circuit arrangement of electronic components and rapid experimental interchange of similar components having different characteristic values, comprising: a plurality of groups of first and second types of conductive electrical terminal means, one of the types being demountable jacks and the other type being demountable plugs each physically and electrically cooperable with any of said jacks; a set of at least a first of insulative base plate means each having an array of apertures therein arranged in rows on a repetitive basic equilateral triangular mode of fixed interapices dimension whereby any three next-adjacent apertures are located at the apices of a triangle of dimensions equal to that of the mode, and each of at least a plurality of modules of said apertures having mounted therein a respective one of the said first type of electrical terminal means; a plurality of interchangeable pedestal structures each having mounted thereon a plurality of mutually interchangeable terminal means of said second type spaced apart and mounted in a mode compatible with said basic equilateral triangular mode for cooperation with correspondingly spaced electrical terminals of said first type mounted in apertures in said first of insulative base plates; and a plurality of electronic circuit components selected from the class including transistors, resistors, capacitors, connectors, and electron tubes, each mounted upon a respective one of said pedestal structures and electrically connected to appropriate terminal means thereon, whereby selected sets of said pedestal structures may rapidly be mounted on said first of insulative base plates and thereby electrically concatenated into a readily modified and readily disassemblable electronic circuit conforming with a prescribed circuit diagram.

8. Means according to claim 7, the terminals of said second type being plug-and-jack terminals the jack portion of which is compatible with the plug portion of any other plug terminal of said groups, whereby a set of terminals of said pedestal structures may be stacked one above the other to provide both physical support and electrical connection therebetween.

9. Means according to claim 7, said base plate means being of dimensions such as to provide for coplanar extension and mechanical interconnection by any of said pedestal structures.

10. Means according to claim 7, the terminals of said first type of terminal means being dual jacks whereby pedestal structures may be mounted on opposed faces of said base plate means.

11. Means according to claim 10, the terminals of said second type being plug-and-jack terminals the jack portion of which is compatible with the plug portion of any other plug terminal of said groups, whereby a set of terminals of said pedestal structures may be stacked in superposed relation to provide both physical support and electrical connection therebetween.

12. Means according to claim 10, the terminals of said second type being plug-and-jack terminals the jack portion of which is compatible with the plug portion of any other plug terminal of said groups, whereby a set of terminals of said pedestal structures may be stacked one above the other to provide physical support for and electrical connections between said first insulative base plate means and a second of the set of insulative base plate means, whereby a plurality of groups of electronic constructions may readily be fabricated and electrically interconnected and modified.

13. Means according to claim 7, said base plate means being transparent to facilitate visual inspection of the circuit construction at all stages of assembly and modification.

14. Means according to claim 13, the terminal means of said second type on any of said pedestal structures being mounted in a mode compatible with said basic equilateral triangular mode and selected from (*a*) said basic equilateral triangular mode (*b*) whole number multiples of said equilateral triangular mode (*c*) a two-point mode of dimensions equal to the inter-apices spacing of the apertures of said basic triangular mode and (*d*) a mode of dimensions equal to a whole number multiple of said two-point mode.

References Cited in the file of this patent

UNITED STATES PATENTS

| | | |
|---|---|---|
| 2,028,717 | Hayden | Jan. 21, 1936 |
| 2,268,619 | Reid | Jan. 6, 1942 |
| 2,568,535 | Ballard | Sept. 18, 1951 |
| 2,588,777 | Thompson | Mar. 11, 1952 |
| 2,659,840 | Yonkers | Nov. 17, 1953 |

FOREIGN PATENTS

| | | |
|---|---|---|
| 223,402 | Great Britain | Oct. 23, 1924 |
| 637,596 | Great Britain | May 24, 1950 |

OTHER REFERENCES

Electrical Manufacturing, October 1954, pages 134–137.